United States Patent [19]

Aldrich

[11] Patent Number: 4,589,435
[45] Date of Patent: May 20, 1986

[54] WATER SHUTOFF VALVE

[76] Inventor: Donald C. Aldrich, P.O. Box 91, Sweeney, Tex. 77480

[21] Appl. No.: 653,709

[22] Filed: Sep. 24, 1984

[51] Int. Cl.⁴ ............................................. F16K 21/16
[52] U.S. Cl. .................................... 137/102; 137/456; 137/624.11; 137/624.12; 137/625.22; 251/16; 251/305; 251/129.20
[58] Field of Search ................. 137/456, 625.2, 625.21, 137/625.22, 625.24, 624.11, 624.12, 102, 107; 251/15, 16, 138, 305, 307, 308

[56] References Cited

U.S. PATENT DOCUMENTS

| | | | |
|---|---|---|---|
| 340,630 | 4/1886 | Simms | 137/625.22 |
| 1,678,204 | 7/1928 | Srulowitz | 137/625.2 |
| 1,955,661 | 4/1934 | Waldo | 137/625.21 X |
| 1,956,010 | 4/1934 | Diescher . | |
| 3,416,560 | 12/1968 | Bruno . | |
| 3,417,782 | 12/1968 | Mentnech . | |
| 3,831,632 | 8/1974 | Young . | |
| 4,012,673 | 3/1977 | Saarem | 137/624.11 X |
| 4,180,088 | 12/1979 | Mallett | 137/459 X |
| 4,249,565 | 2/1981 | Brust | 137/624.11 X |
| 4,252,088 | 2/1981 | Frisby . | |

FOREIGN PATENT DOCUMENTS

| | | | |
|---|---|---|---|
| 51874 | 5/1982 | European Pat. Off. | 137/624.11 |
| 3012399 | 8/1981 | Fed. Rep. of Germany | 137/624.11 |
| 2468069 | 4/1981 | France | 137/624.11 |
| 149518 | 9/1931 | Switzerland | 251/138 |

*Primary Examiner*—Robert G. Nilson
*Attorney, Agent, or Firm*—Gun, Lee & Jackson

[57] ABSTRACT

A water shutoff valve is disclosed in the preferred embodiment comprising a cylindrical body having a valve disk and water flow sensor therein. The sensor is operatively connected to a timer which automatically resets to zero upon interruption of water flow through the valve. The valve automatically closes upon continuous flow of water through the valve for a predetermined period of time, indicating a potential leak in the water supply line. The timer may be set for selected time intervals permitting the valve to remain open for short or long intervals as required.

8 Claims, 1 Drawing Figure

U.S. Patent    May 20, 1986    4,589,435
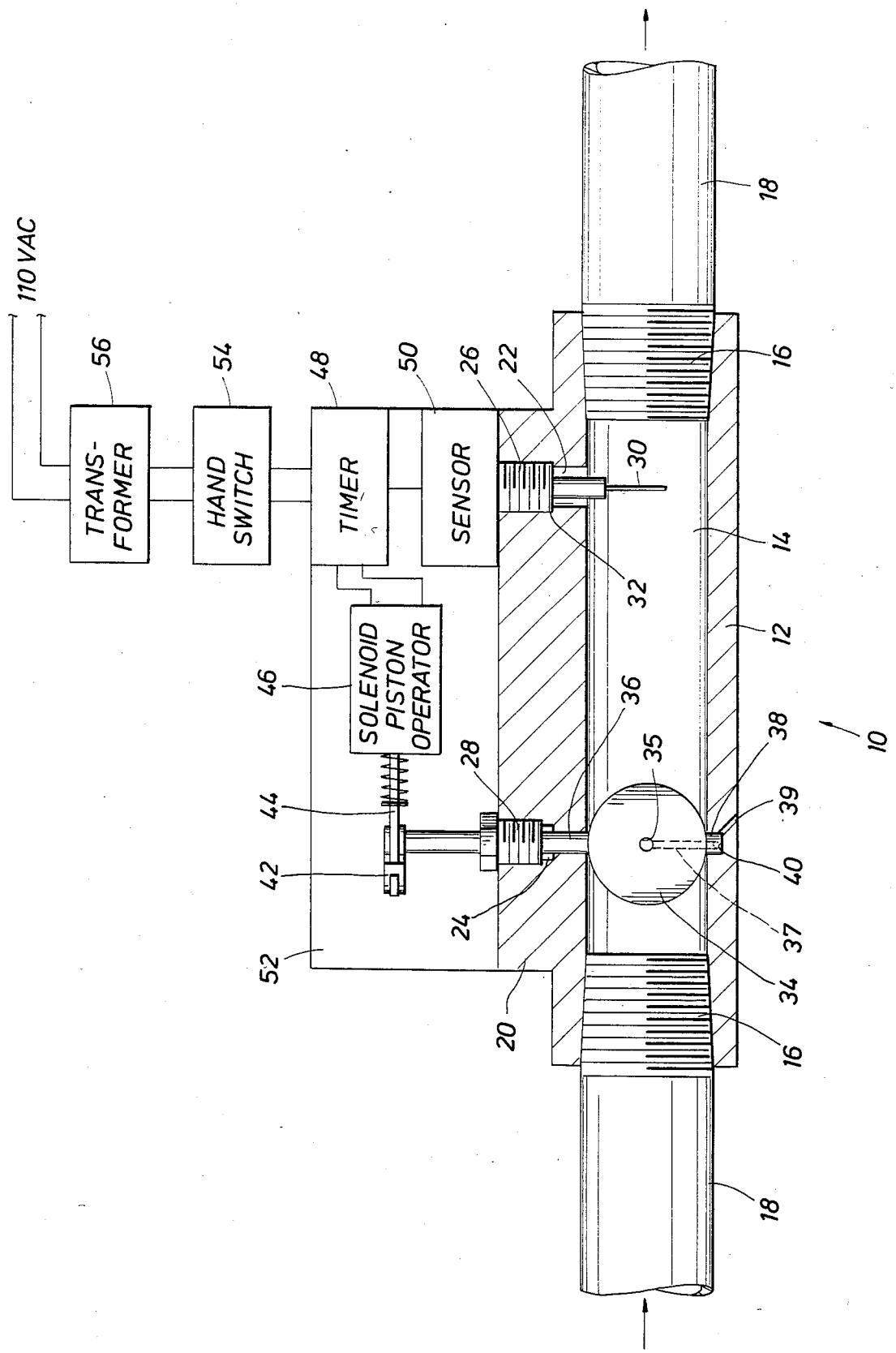

WATER SHUTOFF VALVE

BACKGROUND OF THE DISCLOSURE

This invention is directed to water shut off systems, particularly to a water shutoff valve incorporated in the water supply line of a household for automatically shutting off the flow of water into the household in the event of a leak or break in the water supply line.

Oftentimes, it is desired that the water supply to a house or other type of dwelling be shut off. This is particularly true when the householders are leaving their house for a prolonged period, as for example, when going on vacation. However, shutting off the main water supply valve is a chore which is often overlooked in the last minute preparations prior to leaving the house. The purpose of shutting off the water supply is to prevent damage to the house should an extensive leak occur while the householder is away. Rarely is the water supply into a house shut off when the householder is away for a short period of time, as for example, when at work. Yet, cumulative leakage from a burst pipe can cause tremendous damage to the house and contents even if discovered and stopped within a relatively short period of time.

Another problem encountered by householders, particularly in the summer months, is a leaking water faucet or one that has not been completely turned off. Thousands of gallons of water may be wasted from a partially open water faucet left unattended.

Water shutoff systems are known in the prior art as exemplified by U.S. Pat. No. 4,180,088 to Mallett. The Mallett patent discloses a water shutoff system incorporating a flow sensing valve which detects flow in a water line and electrically powers a line valve to the closed position. An on/off control switch in the electrical sensing circuit permits the system to be conveniently turned off and on. The water shutoff system of Mallett is responsive to flow in the line and is connected to a selecting switch so that the switch can be turned to a position wherein water can be used, and also switched to a safety position wherein flow of water causes interruption of the water system valve. A disadvantage with the Mallett apparatus is that the device does not continually monitor water flow through the valve, thus requiring the householder to set the valve to the safety position for detection of water leakage.

SUMMARY OF THE DISCLOSURE

The present disclosure is directed to a water shutoff valve comprising a cylindrical body internally threaded at each end for connection to a water supply line. The valve body includes an axial passage extending therethrough. A valve disk is pivotly mounted in the axial passage of the valve body. A flow sensor extends into the axial passage of the valve body for sensing fluid flow therethrough. The sensor is operatively connected to a timing mechanism which in turn is operatively connected to a valve actuator for opening and closing the valve disk. A power supply provides power for operation of the shutoff valve.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single FIGURE of the drawing is a sectional view of the preferred embodiment of the water shut off valve of the invention incorporating a schematic of the wiring.

DETAILED DESCRIPTION OF THE PREFERRED EMBODIMENT

Generally, water is supplied to a house through a water supply line which enters the house and is distributed throughout the house through various distribution lines. The water supply line typically includes a main shut off valve located outside of the house for shutting off all water flow into the house. Shutoff valves are also located throughout the house for shutting off the water to a specific household appliance, for example, an automatic washing machine. When a leak occurs, however, the main shutoff valve is typically shut off preventing the entry of water into the house until the source of the leak is determined. If the area of the leak can be isolated by shutting off one or more of the shutoff valves within the house, then those valves are shut off and the main valve is open so that water may be supplied to other areas of the house.

Water leakage in a house can cause extensive damage to the house and the furnishings. Leakage can occur from various events. Burst pipes resulting from cold weather is a common problem during the winter months, particularly in areas not accustomed to sub-freezing temperatures. Also, supply lines to household appliances such as the dishwasher or the clothes washing machine deteriorate over a period of time and burst. Inclement weather such a hurricanes, tornadoes or the like can damage the structure of the house causing pipes to burst or leak. Also, earthquakes can cause pipes to flex and break resulting in leakage.

The apparatus of the present disclosure generally identified by the reference numeral 10 in the drawing is incorporated in the water supply line of a house to mitigate water damage resulting from leakage in the house by automatically shutting off the flow of water into the house. The apparatus 10 is incorporated in the water supply line at the inlet of the water supply line outside of the house. The apparatus 10 may be incorporated between the main shut off valve in the water supply line and the point of entry of the water supply line into the house. In some areas, particularly where sub-freezing weather is common, it may be desired to locate the apparatus 10 in the water supply line underground reducing the possibility of water being frozen in the apparatus 10.

The apparatus 10 comprises a valve body 12 open at each end and including an axial passage 14 extending therethrough. The ends of the valve body 14 are internally threaded for threadably engaging the threaded ends 16 of the water supply line 18 (or connective nipples to the line). The valve body 12 is substantially cylindrical and approximately six inches in length. The axial passage 14 is approximately one inch in diameter for connection to the water supply line 18 which is typically a one inch pipe for most household water supply systems. The cross sectional area of the axial passage 14 is substantially the same as the cross sectional area of the pipe 18 so that the water flow restriction through the apparatus 10 is minimized. Water flow through the apparatus 10 is in the direction indicated by the arrows in the drawing.

The apparatus 10 includes a raised portion 20 which extends partially about the valve body 12. The raised portion 20 increases the thickness of the valve body 12 providing a mounting base or pad for mounting associated equipment thereon described in greater detail later herein. Adjacent the outlet end of the apparatus 10, an aperture 22 extends through the raised portion 20 opening into the axial passage 14. Similarly, an aperture 24 extends through the raised portion 20 opening into the axial passage 14 adjacent the inlet end of the apparatus 10. The apertures 22 and 24 are interiorly threaded for receiving threaded connectors 26 and 28, respectively. A flow sensing probe 30 extends from the connector 26. The connector 26 is threadably advanced into the aperture 22 and seats against a circumferential shoulder 32 radially extending into the aperature 22. The probe 30 extends from the connector 26 into the axial passage 14. The probe 30 senses even the slightest flow of fluid through the apparatus 10. O-ring seals or the like (not shown in the drawing) prevent leakage of fluid past the connectors 26 and 28.

A valve disk 34 is located in the axial passage 14 upstream from the probe 30. The valve disk 34 is connected to a valve stem 36 which extends through the aperture 24 and connector 28. The valve stem 36 includes a pivot end 38 received in a registration cavity 40 located in the valve body 12 opposite the aperture 24. The end 38 is an extension of the stem 36 enabling rotation of the valve disk 34 about an axis substantially perpendicular to the longitudinal axis of the passage 14 and the direction of fluid flow through the valve body 12.

The valve disk 34 is provided with an inlet opening 35 to a drain passage shown in broken line at 37 which, in the closed position of the valve, is positioned in registry with the outlet passage 39 extending through the valve body 12. In the closed position of the valve disk 34, water downstream in the supply line above the level of the valve 10 will pass through the inlet opening 35 to the drain passage 37 and the outlet passage 39. Closure of the valve disk 34, therefore, accomplishes automatic draining of the housing water supply system downstream of the valve 10. It should be borne in mind, however, that only those portions of the water supply system will be drained that will drain by gravity through the supply line 18. Some sections of the water supply line will not be drained, but with the water supply line partially drained, expansion that takes place on ice formation is accommodated by permitting the ice to expand within the pipe. Thus, minimizing the liklihood that a water-filled pipe will burst upon freezing. In the open position of the valve disk 34, the drain passage 37 is out of registry with the outlet passage 39, and therefore, fluid does not drain or leak out through the outlet passage 39.

The valve stem 36 includes a linkage arm 42 connected to a connecting rod 44 having one end connected to a solenoid piston operator 46. The piston operator 46 is connected to a timer 48. The timer 48 can be of any suitable type which can be manually set for any duration of time within a wide range and can time out after a set time. The sensing probe 30 is connected to a sensor circuit 50 which in turn is connected to the timer 48. The piston operator 46 normally holds the valve disk 34 open so that fluid passes through the axial passage 14, which fluid flow is sensed by the sensor probe 30 and sensor circuit 50. The sensor circuit 50 produces an encoded electrical signal indicative of the fluid flow. The signal is received by the timer 48 and the elapsed time of fluid flow is registered by the timer 48. If uninterrupted fluid flow continues for a predetermined time interval, for example, ten minutes, the timer 48 actuates the piston operator 46 which closes the valve disk 34, shutting off the water supply to the house. After the leak has been located and repaired, the timer 48 is reset and the piston operator 46 returns to its initial position and thereby opening the valve disk 34, permitting fluid to flow through the apparatus 10. A removable cover 52 encloses the raised portion 20, protecting the sensor 50, timer 48, piston operator 46 and valve stem 36 from dirt and other foreign matter.

A hand switch 54 and transformer 56 are remotely located from the apparatus 10 in a convenient location. The hand switch 54 may be located within the house, perhaps in the kitchen, for conveniently activating the apparatus 10. The hand switch 54 may be a two or three position switch havng an on/off and automatic setting. During prolonged periods of water usage, for example, when watering the lawn or washing clothes, it may be desireable to disengage the apparatus 10 by positioning the hand switch 54 to the off position. In the off position, the valve disk 34 remains open, permitting water to flow through the apparatus 10 uninterrupted. Normal household usage of water is usually for short periods of time and the water is continually turned on and off. The apparatus 10 does not interfer with the normal household routine of water usage. For example, the timer 48 may be set for a ten minute interval to accommodate a typical water usage pattern. The timer 48 resets to zero each time that water flow through the apparatus 10 is interrupted. This permits normal household chores to be done without shutting off the water supply to the house. The timer 48, however, may be set for any time interval to accomodate the water usage habits of the household. When leaving for the day or on a trip, the timer 48 may be reset to a shorter timer interval, perhaps thirty seconds, so that the water supply system will be shut off in the event that fluid flow through the apparatus 10 is detected.

The apparatus 10 is particularly useful for monitoring the water flow through a household water supply distribution system. On occasion, a slow drip may develop in a faucet, or a garden hose may be left on unattended and forgotten. The apparatus 10 will automatically shut off the water supply to the house and thereby prevent waste of water and reduce the expense of water usage to the household.

While the foregoing is directed to the preferred embodiment of the present invention, other and further embodiments of the invention may be devised without departing from the basic scope thereof, and the scope thereof is determined by the claims which follow:

What is claimed is:

1. A shutoff valve for shutting off a fluid line in response to fluid flow through the line for a selected time intervals, said shutoff valve comprising:
   (a) a valve body open at each end and having an axial passage extending therethrough;

(b) a normally open valve disk mounted in said axial passage to prevent fluid flow through the fluid line on closing of said valve disk;

(c) valve actuator means for closing said valve disk in response to fluid flow through the fluid line;

(d) a valve stem extending from said valve disk through said valve body and operatively connected to said actuator means, said valve stem further including an end pivotally received in a mating aperture formed in said valve body;

(e) a drain outlet passage in said valve body for registry with another drain passage extending partially through said valve disk permitting fluid to drain from said fluid line upon closure of said valve disk;

(f) sensing means supported by said valve body for sensing fluid flow through said axial passage, said sensing means producing an electrical signal indicative of the fluid flow;

(g) timer means connected with said valve actuator means and said sensing means, said timer means being settable in a selected time interval for energizing said actuator means to close said valve disk on receipt of an encoded electrical signal from said sensing means indicating continuous fluid flow through said valve for the selected time interval; and (h) switch means connecting said valve via transformer means to a power source to provide electrical power.

2. The apparatus of claim 1 wherein said valve actuator means is a solenoid piston operator including a reciprocal connecting rod, one end of which is connected to said valve stem and the other end to said piston operator.

3. The apparatus of claim 1 wherein said sensing means comprises an electrical circuit connected to a probe extending into said axial passage.

4. The apparatus of claim 1 wherein said timer means comprises an electrical circuit for energizing said actuator means.

5. The apparatus of claim 4 wherein said timer means automatically resets to zero upon interruption of fluid flow through said valve.

6. The apparatus of claim 1 wherein said switch means comprises a selector switch positionable between an on/off position for energizing said timer means and said sensing means.

7. The apparatus of claim 1 wherein said valve body is internally threaded adjacent each end thereof for connection in a fluid line.

8. The apparatus of claim 1 wherein said valve body includes a valve cover enclosing said actuator means, said timer means, and said sensing means.

* * * * *